R. LEWIS.
JAM NUT.
APPLICATION FILED MAR. 5, 1909.

965,202.

Patented July 26, 1910.

WITNESSES:

INVENTOR.
Robert Lewis
BY
H. B. Schermerhorn
ATTORNEY.

UNITED STATES PATENT OFFICE.

ROBERT LEWIS, OF NORWOOD, PENNSYLVANIA.

JAM-NUT.

965,202.  Specification of Letters Patent.  Patented July 26, 1910.

Application filed March 5, 1909. Serial No. 481,469.

*To all whom it may concern:*

Be it known that I, ROBERT LEWIS, a citizen of the United States, residing at Norwood, in the county of Delaware and State of Pennsylvania, have invented a new and useful Improvement in Jam-Nuts, of which the following is a specification.

My invention relates to jam nuts and my object is to provide a nut of this character which will automatically bind or lock itself upon the threaded shank of a bolt when turned up thereon to a final bearing. This I accomplish by the means herein described and shown in the accompanying drawings, in which—

Figure 1:
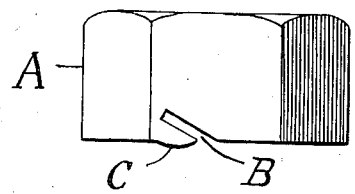
Figure 2:
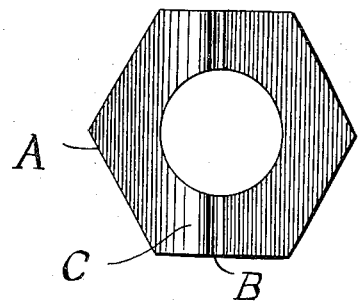

Figure 1 is a side view of the nut; Fig. 2 a view of the inner face or base of the nut, and Fig. 3 a view of the nut when locked upon the bolt.

Figure 3:
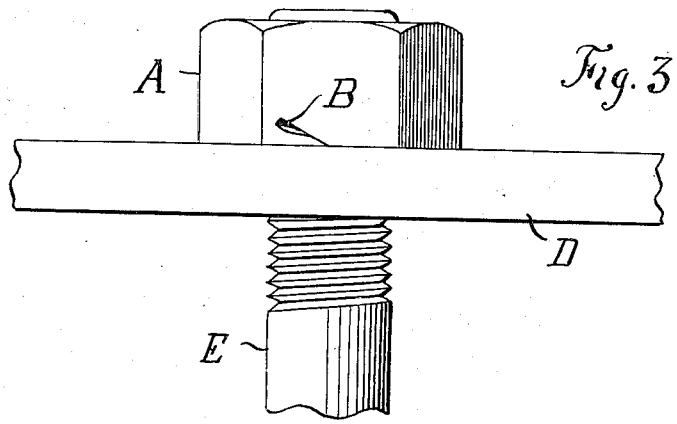

The base or inner face of the nut A is formed with a diagonal slot B extending across the nut from side to side, at or near the middle as shown in Figs. 1 and 2. The lip or tongue C which bounds the lower side of the slot is formed with a slight swelling or ridge, which when the nut is turned on the bolt and brought to a firm and final bearing, as in Fig. 3 causes the lip C to be forced inward and thus operates to close or pinch together the edges of the slot. As the lip C is thus forced inward its edge cuts into and destroys the thread of the bolt as the nut is turned up to its final position, as shown in Fig. 3, thus effectively locking the nut upon the bolt. A nut of this form may, it is true, be removed after having been thus locked in place, but this can only be accomplished by the use of a wrench of considerably greater length and leverage than that which was used to turn the nut into position; and upon such removal of the nut it will be found that the thread of the bolt has been cut or shaved throughout its length by the edge of the lip or tongue C.

The ridge or swell upon the lower side of the lip should be only slightly raised above the plane of the base of the nut, in order that when the lip has been forced inward and the slot is pinched shut, as in Fig. 3, the entire base of the nut may come to a bearing.

In Fig. 3, E is the threaded bolt, and D represents the surface to be secured in place thereon by the nut.

What I claim as my invention and desire to secure by Letters Patent is:—

A nut, having its base formed with a diagonal slot extending entirely across the diameter of the nut to provide a lip on each side of the bore of the nut, said lips alining, and extending at an acute angle, and having their inner surfaces threaded, and their face portions each formed with a protuberance for the purpose set forth.

ROBERT LEWIS.

Witnesses:
JOHN B. RUTHERFORD,
H. B. SCHERMERHORN.